US012812670B2

(12) United States Patent
Malkamäki et al.

(10) Patent No.: US 12,812,670 B2
(45) Date of Patent: Nov. 24, 2026

(54) SPS ACTIVATION REQUEST FOR MBS MULTICAST IN RRC INACTIVE

(71) Applicant: Nokia Technologies Oy, Espoo (FI)

(72) Inventors: Esa Mikael Malkamäki, Espoo (FI); Ugur Baran Elmali, Munich (DE); Philippe Godin, Versailles (FR); Bighnaraj Panigrahi, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 274 days.

(21) Appl. No.: 18/623,465

(22) Filed: Apr. 1, 2024

(65) Prior Publication Data

US 2024/0334475 A1 Oct. 3, 2024

(30) Foreign Application Priority Data

Apr. 3, 2023 (IN) ............................ 202341025215

(51) Int. Cl.

| | |
|---|---|
| ***H04W 74/04*** | (2009.01) |
| ***H04W 48/20*** | (2009.01) |
| ***H04W 72/11*** | (2023.01) |
| ***H04W 74/0833*** | (2024.01) |
| ***H04W 76/19*** | (2018.01) |
| ***H04W 80/02*** | (2009.01) |

(52) U.S. Cl.

CPC ........... *H04W 74/04* (2013.01); *H04W 48/20* (2013.01); *H04W 72/11* (2023.01); *H04W 74/0833* (2013.01); *H04W 76/19* (2018.02); *H04W 80/02* (2013.01)

(58) Field of Classification Search

CPC ..... H04W 74/04; H04W 76/19; H04W 72/11; H04W 48/20; H04W 74/0833; H04W 80/02

USPC ........................................................ 370/329

See application file for complete search history.

(56) References Cited

U.S. PATENT DOCUMENTS

| | | | | |
|---|---|---|---|---|
| 2018/0115430 | A1 | 4/2018 | Seo | |
| 2018/0270812 | A1* | 9/2018 | Lee | H04W 72/20 |
| 2019/0394794 | A1* | 12/2019 | Mali | H04W 72/23 |
| 2022/0330213 | A1* | 10/2022 | Lee | H04L 1/1864 |
| 2022/0346124 | A1* | 10/2022 | Lee | H04W 72/23 |
| 2023/0071767 | A1* | 3/2023 | Zhou | H04L 1/1854 |
| 2024/0155311 | A1* | 5/2024 | Elmali | H04W 4/06 |
| 2024/0306138 | A1* | 9/2024 | Munier | H04W 72/11 |

OTHER PUBLICATIONS

EESR in EP 24167085.0 dated Jul. 12, 2024—8 pgs.

* cited by examiner

*Primary Examiner* — Nicholas R Taylor
*Assistant Examiner* — Chong G Kim
(74) *Attorney, Agent, or Firm* — Lippes Mathias LLP

(57) ABSTRACT

A method comprising determining with an apparatus, where the apparatus comprises a user equipment in an inactive state or an idle state, that a scheduling is activated in a cell, where the user equipment has not received scheduling activation regarding the scheduling activated in the cell, and where the user equipment has selected the cell; based upon the determining that the scheduling is activated in the cell, sending, with the user equipment, a signal to a network element, where the signal is configured to request activation of the scheduling; receiving scheduling activation from the network element in response to the signal, and upon receiving the scheduling activation, receiving data according to the scheduling.

16 Claims, 12 Drawing Sheets

SPS ACTIVATION REQUEST FOR MBS MULTICAST IN RRC INACTIVE

TECHNICAL FIELD

The example and non-limiting embodiments relate generally to multicast reception and, more particularly, to a user equipment in an inactive state or an idle state.

BRIEF DESCRIPTION OF PRIOR DEVELOPMENTS

It is known to allow multicast broadcast services to be received when a user equipment is in a connected state.

SUMMARY OF THE INVENTION

The following summary is merely intended to be an example. The summary is not intended to limit the scope of the claims.

In accordance with one aspect, an example method is provided comprising: receiving, with a user equipment, a configuration for a scheduling for a cell; sending, with the user equipment in an inactive state or an idle state, where the user equipment has selected the cell and has not received activation of the scheduling for the cell, a signal to a network element, where the signal is configured to request the activation of the scheduling; receiving scheduling activation from the network element in response to the signal, and upon receiving the scheduling activation, receiving data according to the scheduling.

In accordance with another aspect, an example method is provided comprising: receiving, by with a user equipment, scheduling configuration information including downlink control information (DCI) activation information; and based, at least partially upon the received scheduling configuration information, receiving data according to the scheduling configuration information.

In accordance with another aspect, an example apparatus is provided comprising: at least one processor; and at least one non-transitory memory storing instructions that, when executed with the at least one processor, cause the apparatus to perform: receiving a configuration for a scheduling for a cell; sending, with the apparatus in an inactive state or in an idle state where the apparatus has selected the cell and has not received activation of the scheduling for the cell, a signal to a network element, where the signal is configured to request the activation of the scheduling; receiving scheduling activation from the network element in response to the signal; and upon receiving the scheduling activation, receiving data according to the scheduling.

In accordance with another aspect, an example apparatus is provided comprising: means for receiving a configuration for a scheduling for a cell; means for sending, with the apparatus in an inactive state or an idle state where the apparatus has selected the cell and has not received activation of the scheduling for the cell, a signal to a network element, where the signal is configured to request the activation of the scheduling; means for receiving scheduling activation from the network element in response to the signal; and means for, upon receiving the scheduling activation, receiving data according to the scheduling.

In accordance with another aspect, an example embodiment is provided with a non-transitory program storage device readable by an apparatus, tangibly embodying a program of instructions executable with the apparatus for performing operations, the operations comprising: receiving, with the apparatus where the apparatus comprises a user equipment, a configuration for a scheduling for a cell; sending, with the user equipment in an inactive state or an idle state, where the user equipment has selected the cell and has not received activation of the scheduling for the cell, a signal to a network element, where the signal is configured to request the activation of the scheduling; receiving scheduling activation from the network element in response to the signal; and upon receiving the scheduling activation, receiving data according to the scheduling.

In accordance with another aspect, an example method is provided comprising: receiving a request for a scheduling activation from a user equipment in an inactive state or an idle state; and based upon the receiving of the request for the scheduling activation from the user equipment, sending a signal to the user equipment, where the signal comprises information for the scheduling activation.

In accordance with another aspect, an example apparatus is provided comprising: means for receiving with the apparatus, where the apparatus comprises a user equipment, scheduling configuration information including downlink control information activation information; and means for, based at least partially upon the received scheduling configuration information, receiving data according to the scheduling configuration information.

In accordance with another aspect, an example apparatus is provided comprising: at least one processor; and at least one non-transitory memory storing instructions that, when executed with the at least one processor, cause the apparatus to perform: receiving a request for a scheduling activation from a user equipment in an inactive state or an idle state; and based upon the receiving of the request for the scheduling activation from the user equipment, sending a signal to the user equipment, where the signal comprises information for the scheduling activation.

In accordance with another aspect, an example apparatus is provided comprising: means for receiving a request for a scheduling activation from a user equipment in an inactive state or an idle state; and means for, based upon the receiving of the request for the scheduling activation from the user equipment, sending a signal to the user equipment, where the signal comprises information for the scheduling activation.

In accordance with another aspect, an example device is provided comprising a non-transitory program storage device readable by an apparatus, tangibly embodying a program of instructions executable with the apparatus for performing operations, the operations comprising: receiving a request for a scheduling activation from a user equipment in an inactive state or an idle state; and based upon the receiving of the request for the scheduling activation from the user equipment, sending a signal to the user equipment, where the signal comprises information for the scheduling activation.

According to some aspects, there is provided the subject matter of the independent claims. Some further aspects are provided in subject matter of the dependent claims.

BRIEF DESCRIPTION OF DRAWINGS

The foregoing aspects and other features are explained in the following description, taken in connection with the accompanying drawings, wherein.

DETAILED DESCRIPTION

Figure 1:
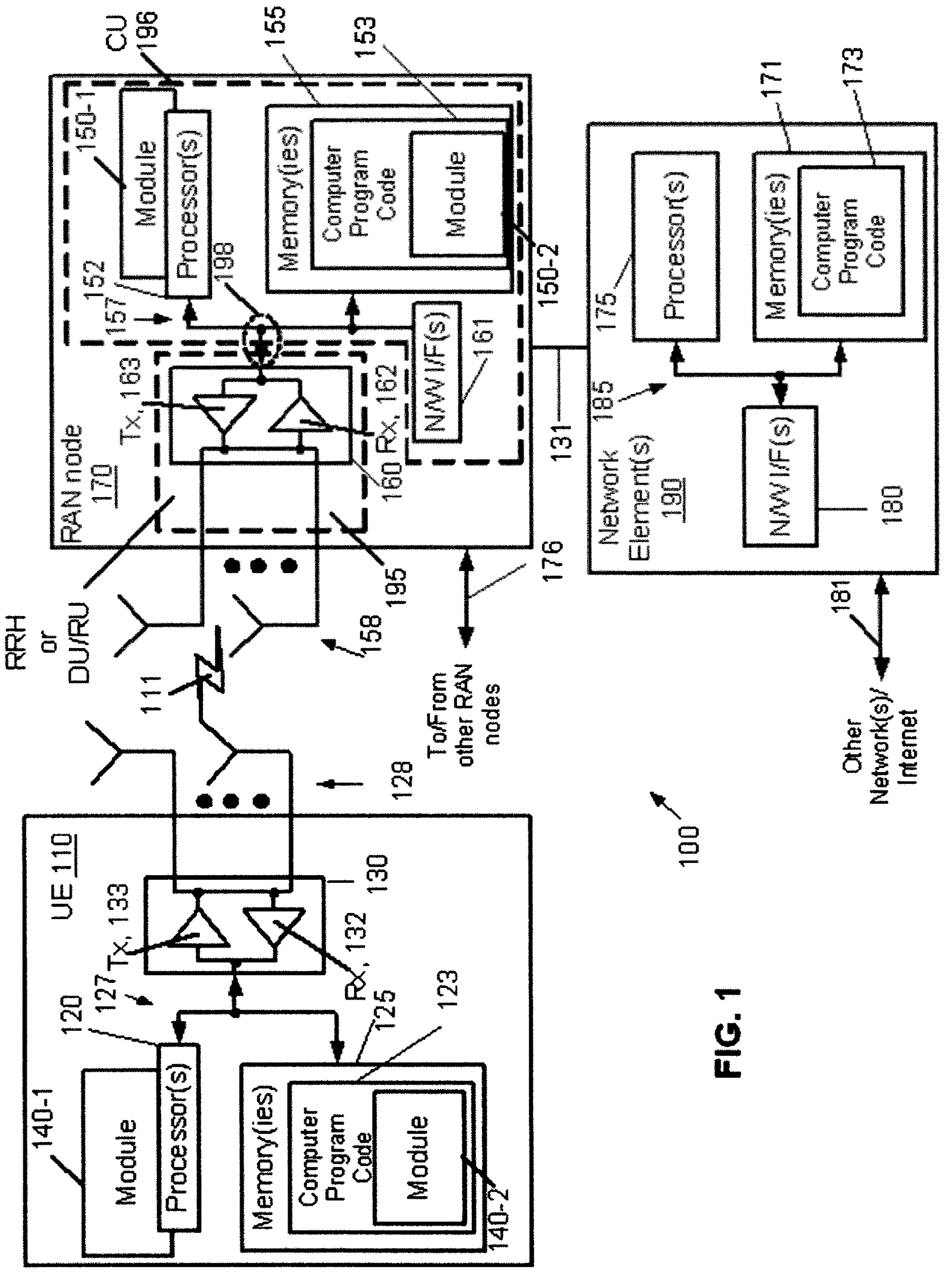
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
AMF access and mobility management function
CE control element
C-RNTI cell radio network temporary identifier
CS-RNTI configured scheduling radio network temporary identifier
CU central unit
DCI downlink control information
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
FedAvg federated averaging
FL federated learning
G-CS-RNTI group configured scheduling radio network temporary identifier
gNB (or gNodeB) base station for 5G/NR, i.e., a node providing NR user plane and control plane protocol terminations towards the UE, and connected via the NG interface to the 5GC
HARQ hybrid automatic repeat request
HARQ ACK HARQ acknowledgement
HARQ NACK HARQ negative acknowledgement
I/F interface
LCID logical channel ID
LTE long term evolution
MAC medium access control
MAC-CE medium access control-control element
MBS multicast and broadcast services
MCCH MBS control channel
MCS modulation and coding scheme
MME mobility management entity
MPEG moving picture experts group
MTCH MBS traffic channel
ng or NG new generation
ng-eNB or NG-eNB new generation eNB
NN neural network
NR new radio
N/W or NW network
PDCCH physical downlink control channel
PDCP packet data convergence protocol
PDSCH physical downlink shared channel
PHY physical layer
PTM point to multipoint
PTP point to point
PRB physical resource blocks
PRACH physical random access channel
RACH random access channel
RAN radio access network
RAPID random-access preamble ID
Rel release
Rel-17 3GPP release 17
Rel-18 3GPP release 18
RLC radio link control
RNTI radio network temporary identifier
RRH remote radio head
RRC radio resource control
RU radio unit
Rx receiver
SDAP service data adaptation protocol
SGW serving gateway
SIB system information block
SMF session management function
SPS semi-persistant scheduling
TB transport block
TS technical specification
Tx transmitter
UE user equipment (e.g., a wireless, typically mobile device)
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that “cells” perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station’s coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

In Rel-17, NR multicast and broadcast services (MBS) allowed for the UE to only receive multicast in a RRC_CONNECTED state. Reliability of the data reception is ensured via HARQ retransmissions and dynamic MCS selection even for Point-to-Multi-Point (PTM) operation. Furthermore, Point-to-Point (PTP) transmissions can also be configured for UEs in a RRC_CONNECTED state.

Rel-18 started with SA2 SI (SP-211645) on identifying and evaluating further enhancements to the 5GS architecture to provide multicast and broadcast services. The normative work started to finalize with the agreed solutions in TR 23.700-47. The main focus in SA2 SI was KI #1 that focuses on enabling reception of multicast services by the UEs in RRC_INACTIVE state for scalability and power saving purposes:

KI #1: How to enable support for and enhancement related to end-to-end MBS traffic delivery for, including large number of UEs:

Enabling UE's receiving Multicast MBS Session data in RRC states in RRC Inactive state.

Following the work of SA2, RAN WID RP-213568 was agreed for Rel-18, which included the following objective:

Specify support of multicast reception by UEs in RRC_INACTIVE state [RAN2, RAN3]

PTM configuration for UEs receiving multicast in RRC_INACTIVE state [RAN2]

Study the impact of mobility and state transition for UEs receiving multicast in RRC_INACTIVE. (Seamless/lossless mobility is not required) [RAN2, RAN3]

Thus, there was a desire to support multicast reception by UEs in both RRC_CONNECTED state and RRC_INACTIVE state. In the case where a UE is in RRC_INACTIVE state, it may apply the configuration of the multicast service in the cell to start, or to continue, receiving a multicast service the UE has joined. How that configuration shall be performed is currently being studied by RAN2 and RAN3.

One option agreed was to provide the configuration using a method similar to Rel-17 broadcast, i.e., the cell broadcasts SIB/MCCH (multicast control channel) periodically, so that the RRC_Inactive UEs could receive the configuration itself and any updates to that. Furthermore, the UE could be given the configuration of receiving the multicast service in RRC_INACTIVE state while camping at the serving cell, when UE is sent from RRC_CONNECTED to RRC_INACTIVE. Moreover, it was agreed that, at least in some scenarios there would be UEs in RRC_CONNECTED and RRC_INACTIVE state simultaneously receiving the same multicast data (PDSCH) and possibly a same PDCCH that schedules the data.

Semi-persistent scheduling (SPS) is a technique applied already in LTE and NR to save PDCCH resources; especially for services with periodic transmissions. RRC configures, for example, periodicity of SPS transmissions, number of HARQ processes used for SPS. SPS activation is sent over PDCCH and it tells, for example, the resource allocation (physical resource blocks (PRB)), the transport block (TB) size, modulation and coding scheme (MCS). The timing offset for the periodic SPS transmissions is taken from the timing of the PDCCH transmission. Therefore, in order to receive SPS transmission, the UE has to be configured with SPS as well as receive the SPS activation.

For Rel-17 MBS multicast in RRC_CONNECTED, a UE may be configured and activated for SPS reception of MBS multicast services. The UE acknowledges the SPS activation and SPS deactivation by sending a HARQ ACK/NACK, and the network can repeat the SPS activation or deactivation if needed (if there is no ACK). However, SPS cannot be configured for MBS broadcast transmission in Rel-17.

Figure 2:
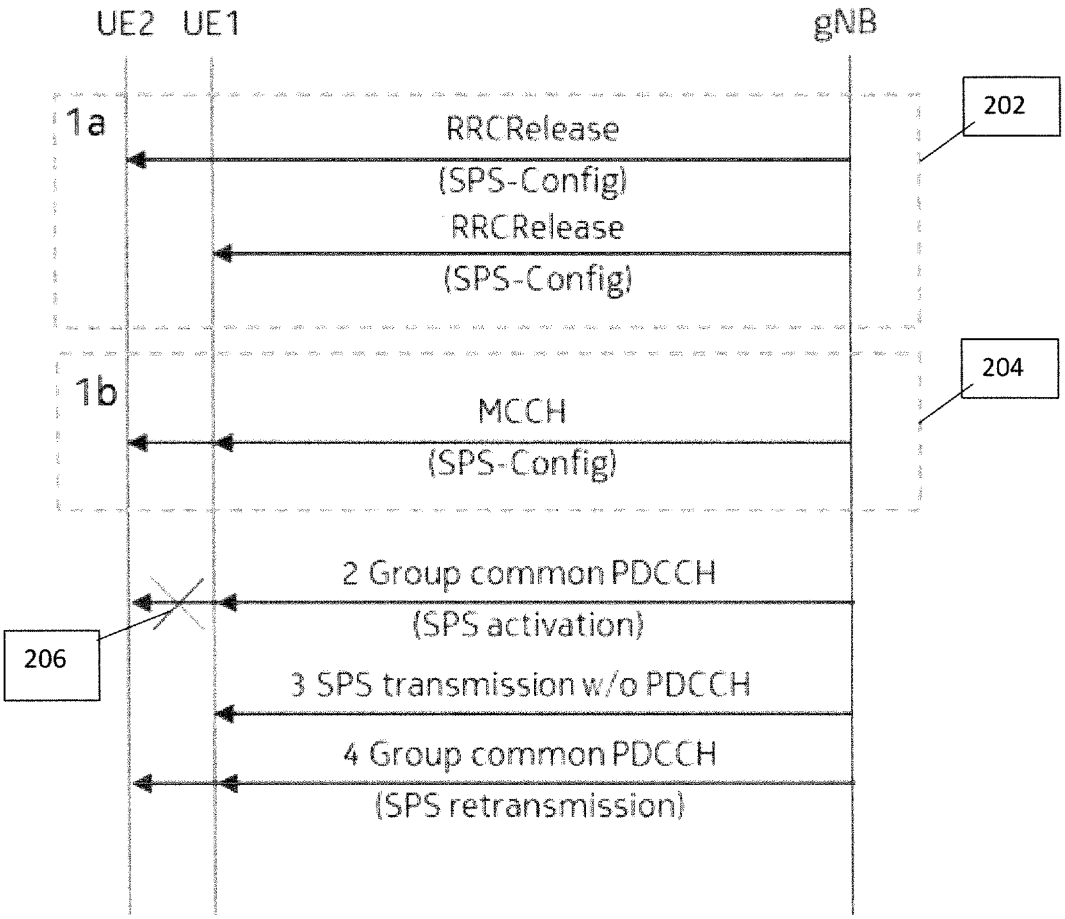
FIG. 2 is a diagram illustrating a method where a semi-persistent scheduling activation is missed by a user equipment.

In release 18, it is proposed that UEs can receive MBS multicast in both a RRC_CONNECTED state and in a RRC_INACTIVE state. However, when a UE is released to a RRC_INACTIVE, the UE stops sending feedback, i.e., neither (H-) ARQ nor other feedback can be sent. Thus, if SPS is configured for MBS multicast, the network does not know whether UEs in a RRC_INACTIVE have received the SPS activation or deactivation. If a UE has missed the SPS activation, it cannot receive the SPS transmissions since the PDSCH for the subsequent transmissions is transmitted without PDCCH (and DCI). Only the potential HARQ retransmission for SPS are indicated with DCI sent over PDCCH. Reference is made to FIG. 2 to illustrate this problem.

As shown in FIG. 2, in step 1, the UE is configured with SPS either via dedicated RRC (1*a*) as illustrated by 202 such as, for example, RRCRelease, or via MCCH (1*b*) as illustrated by 204. In step 2, SPS is activated via group common PDCCH addresses to G-CS-RNTI. As illustrated, UE1 receives the activation whereas, UE2 misses the activation as illustrated with 206. Since UE2 is in a RRC_INACTIVE state, it cannot send HARQ feedback and, thus, the network does not know that UE2 has missed the activation. In step 3, SPS data transmission happens without PDCCH. Thus, UE2 does not receive it because UE2 does not know that the SPS configuration had been activated and, thus, does not have the DCI info to receive the transmission. In step 4, SPS retransmission is scheduled by group common PDCCH addressed to G-CS-RNTI. UE2 may receive the PDCCH, but UE2 typically cannot decode PDSCH since it has missed the SPS activation. UE2 may, however, subsequently notice that SPS has been activated based on the fact that SPS retransmissions are being sent. Features as described herein may be used to address this type of situation. Also, features as described herein may be used to address when a UE in a RRC_INACTIVE state enters a cell where SPS transmission for MBS multicast has been previously activated. Without features as described herein, the entering UE would not be able to receive SPS transmission which started prior to entry of the UE into the cell. In addition, without features as described herein, a gNB cannot even know how many UEs or which UEs are still camping on a cell of this gNB receiving the service in RRC_INACTIVE state. Furthermore, features as described herein may be used in regard to how to make a UE in a RRC_INACTIVE state aware that SPS transmission is activated; in case the UE has missed the activation over PDCCH.

Rel-17 MBS multicast for RRC_CONNECTED UEs support SPS. When a UE receives SPS activation DCI via PDCCH, the UE stores the downlink assignment and the associated HARQ information as configured downlink assignment, and the UE normally acknowledges the reception of the associated transport block. If the network does not receive any acknowledgement, the network assumes that UE did not receive the SPS activation and can send it again. In principle, the network could also repeat the activation blindly since the UE is supposed to initialize or re-initialise the configured downlink assignment when receiving PDCCH whose content indicates SPS activation.

SPS activation and release over PDCCH could be repeated multiple times to improve reliability. This would increase the probability that an INACTIVE UE receives SPS activation or release. However, this would not help for UEs entering the cell later, e.g., due to mobility.

SPS activation could be repeated periodically to allow new incoming UEs to the cell. However, the gNB does not know that a new INACTIVE UE has entered the cell, very frequent repetition would imply minimal gains from SPS, and infrequent repetitions imply that incoming UE would miss a lot of MBS multicast data.

If SPS for MBS multicast was not allowed when UEs are released to RRC_INACTIVE, this would imply that SPS could not be used for MBS multicast in RRC_CONNECTED state either assuming that the same PTM transmission would be received in both states.

The UE can notice that SPS has been activated when the UE receives SPS retransmissions addressed to G-CS-RNTI. However, the UE cannot decode the retransmissions since it has not received the activation telling the TB size, MCS, etc. Alternatively, the detection of the activated SPS may be based on another message carrying the G-CS-RNTI.

Features as described herein may be used in regard to a missed SPS activation (such as due to detection error or due to UE entering another cell for example), and in regard to how to make UEs in RRC_INACTIVE state aware of SPS transmission. Various example embodiments are described below.

In a first type of example embodiment, in regard to a missed SPS activation, there may be a standardised SPS activation request such as, for example, via RACH. A UE in RRC_INACTIVE state could send the standardised SPS activation request to the network when the UE notices that SPS has been activated. For example, the UE may notice that SPS has been activated when the UE detects SPS retransmissions for G-CS-RNTI of interest. The network could then configure a dedicated preamble for requesting SPS activation. There could be a single dedicated preamble for all (MBS) SPS transmissions implying that network should reactivate all SPS transmissions, or there could be a dedicated preamble per G-CS-RNTI, thus, enabling gNB to reactivate SPS transmission for that G-CS-RNTI. The dedicated preamble may have been configured beforehand, e.g. it may be a fixed dedicated preamble or a preamble signalled by the gNB before the SPS activation. The dedicated preamble could be configured together with the SPS configuration (SPS-Config).

In a second type of example embodiment, in regard to a missed SPS activation, SPS activation request could be sent via a message such as Msg3 or MSGA of the random access procedure by standardising a new MAC CE, or by reusing C-RNTI MAC CE. The MAC CE may carry one or more G-CS-RNTI(s) for the SPS transmission(s) that the UE would like to be reactivated. The gNB may respond with a group common PDCCH addressed to G-CS-RNTI activating or deactivating the SPS. This may act as contention resolution and complete the RA procedure. This example may be implemented either with a 4-step random access procedure or a 2-step random access procedure.

In a third type of example embodiment, in regard to a missed SPS activation, a SPS activation request could be sent via a RRCResumeRequest message by standardising a new resume cause. The gNB could respond with RRCResumeReject to keep the UE in the RRC_INACTIVE state. This example may be implemented either with a 4-step random access procedure or a 2-step random access procedure.

In a fourth type of example embodiment, in regard to how to make UEs in RRC_INACTIVE state aware of SPS transmission and in regard to a missed SPS activation, a MBS SPS activation DCI may be provided in a control message, e.g. via SIB/MCCH or a dedicated RRC together with the SPS configuration. This, in practice, may mean specification of the RRC configured downlink assignment (similar to a configured grant (CG) Type 1 for uplink). This may lead to semi-static SPS which, however, could be suitable for some services. The start and stop of SPS transmission may be indicated as MCCH changes. For Rel-17 MBS UEs, SPS may be configured in a Rel-17 way and, in addition, SPS may be activated and deactivated via PDCCH.

The fourth example embodiment does not require a SPS activation request. The fourth example embodiment solves a slightly different problem: To solve the problem how to make UEs in RRC_INACTIVE state aware of SPS transmission as well as to solve the problem of missed SPS activation. The idea of the fourth example embodiment is to provide both 1. the multicast SPS configuration and 2. SPS activation via RRC signalling (dedicated or MCCH); thus ensuring that even UEs entering the cell later can receive multicast SPS. The fourth example embodiment is one possible solution for MBS SPS in RRC_INACTIVE.

In fifth type of example embodiment, features may be used to enable the gNB-CU to receive a request from the UE for the SPS activation and/or SPS re-activation, such as the third example embodiment noted above for example, and to trigger, such as over F1AP (F1 application protocol) for example, the gNB-DU to send or resend the ongoing SPS activation accordingly.

Figure 3:
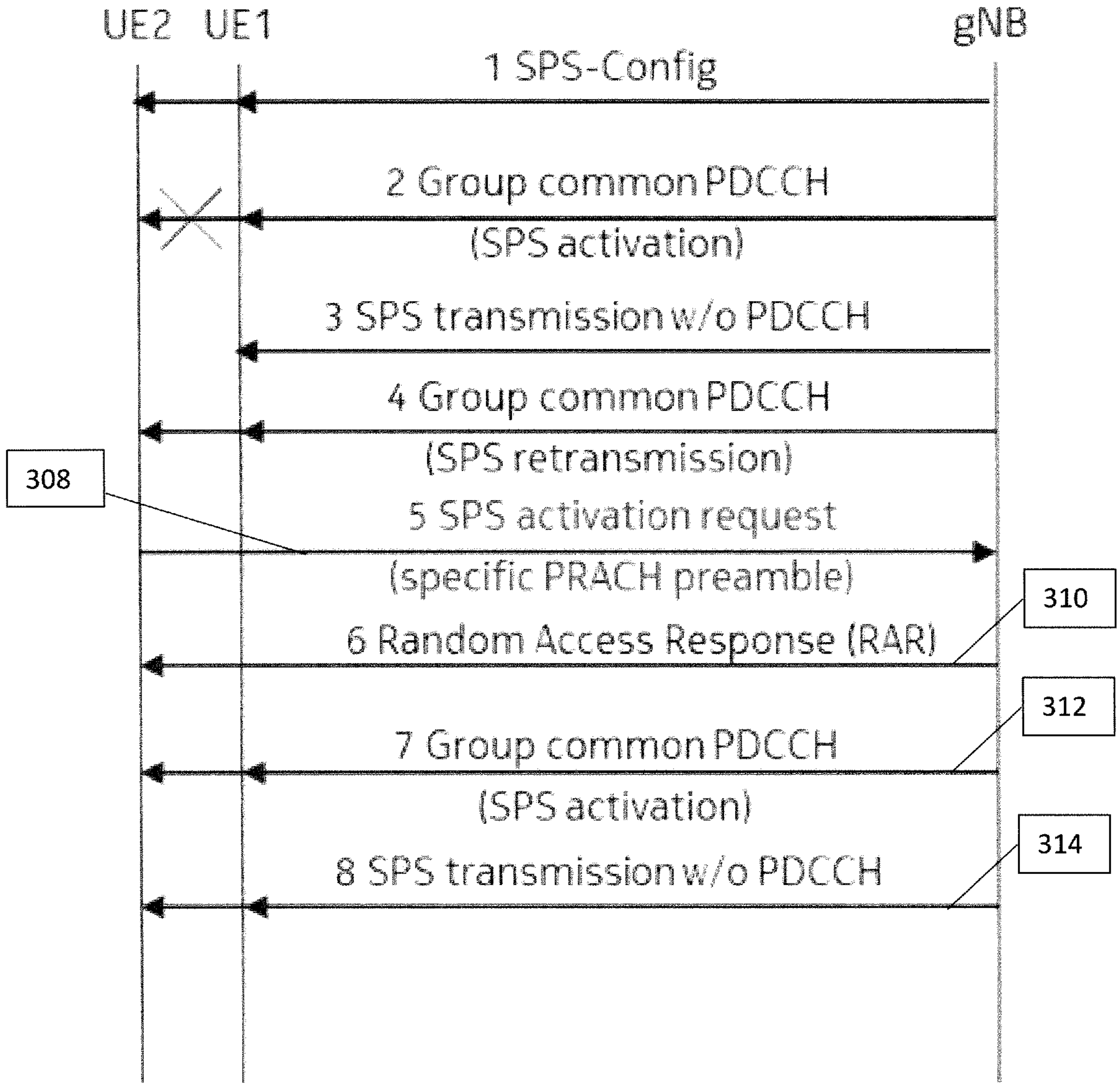
FIG. 3 is a diagram illustrating an example of one type of signaling method.

Referring also to FIG. 3, a diagram is shown for illustrating the signaling for the first example embodiment noted above where the SPS activation request is a specific PRACH preamble. Steps 1 to 4 are the same as in FIG. 2. As illustrated with step 5, when UE2 notices that SPS transmissions are ongoing, but UE2 has not received the SPS activation, the UE2 sends a SPS activation request using a specific PRACH resource(s) (PRACH preamble and/or PRACH occasion) as illustrated with 308. As described above, there can be either a single specific PRACH resource or a PRACH resource (PRACH preamble and/or PRACH occasion) per G-CS-RNTI. The specific PRACH resource could be configured to the UE together with the SPS configuration either when UE2 is released to RRC_INACTIVE or via MCCH (step 1 in FIG. 3 or step 1*a* or 1*b* in FIG. 2). A specific PRACH resource here could mean a specific PRACH preamble (alone), or a specific PRACH occasion (alone), or both a specific PRACH preamble and a specific PRACH occasion. As illustrated with step 6 at 310, the network (the base station gNB in this example) responses with random access response (RAR). In this case it is enough that RAR contains RAPID and the RA procedure ends. In some embodiments this step may not be needed at all such as, for example, step 7 could follow directly after step 5. In that case the RAR window may be configured to be equal or larger than SPS periodicity. As illustrated with step 7 at 312, the network may send a new SPS activation at a time of the configured downlink assignment; thus reactivating the SPS using group common PDCCH addressed to G-CS-RNTI. Any UE configured with MBS multicast and G-CS-RNTI may receive the PDCCH. As illustrated with step 8 at 314, after receiving the SPS activation, UE2 can receive the SPS transmissions (data) sent without PDCCH. If UE2 still cannot receive the SPS activation, the UE may go back to RRC_CONNECTED state and acquire the SPS activation.

In case the SPS reactivation is successful and the UE2 receives the SPS activation in step 7, the UE2 can carry out the whole procedure of FIG. 3 without leaving the RRC_INACTIVE state. The same applies to the other embodiments described herein.

Figure 4:
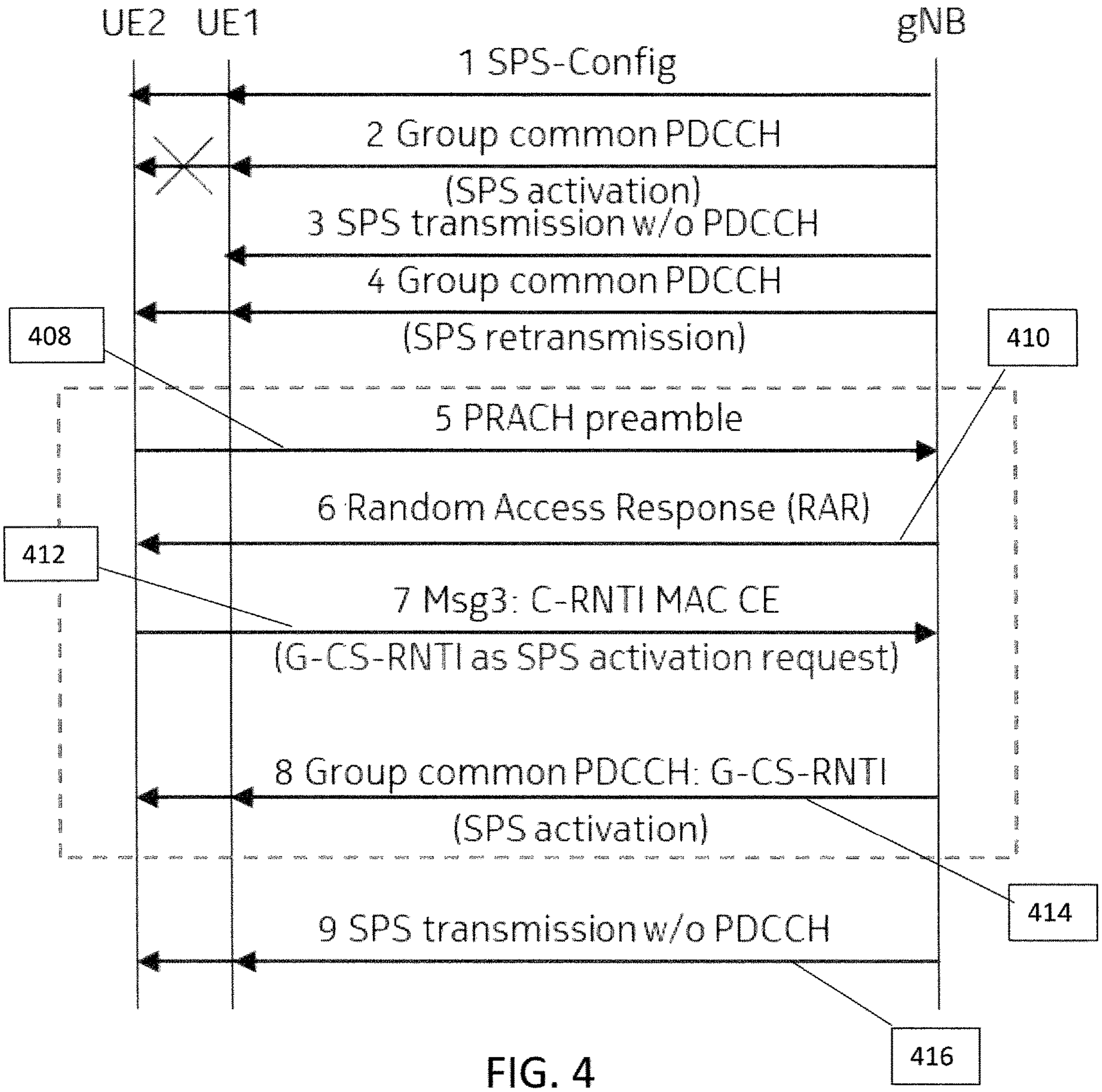
FIG. 4 is a diagram illustrating an example of one type of signaling method.

Referring also to FIG. 4, a diagram is shown for illustrating the signaling for the second example embodiment noted above, for the 4-step random access (RA) example, where the SPS activation request is a MAC CE sent in random access Msg3. The MAC CE may include G-CS-RNTI of the SPS transmission. The MAC CE could be called, for example:

- C-RNTI MAC CE where G-CS-RNTI of the SPS transmission replaces C-RNTI (and use LCID of C-RNTI MAC CE) (shown in FIG. 4), or
- G-CS-RNTI MAC CE or SPS activation request MAC CE (a new LCID may be reserved for it).

Steps 1 to 4 in FIG. 4 are the same as in FIG. 2 described above. As illustrated with step 5 at 408, when UE2 notices that SPS transmissions are ongoing, for instance by receiving a SPS retransmission, but UE2 has not received the SPS activation, UE2 may start a normal random access procedure and send a PRACH preamble in a PRACH occasion. The PRACH preamble may be any preamble and the PRACH occasion may be any PRACH occasion or a specific PRACH resource, i.e., PRACH preamble and/or PRACH occasion, could be specified. As illustrated with step 6 at 410, the network may respond with a random access response (RAR) addressed to RA-RNTI. The RAR may include uplink grant for the Msg3. The RAR may also include a Temporary C-RNTI which is not needed here. As illustrated with step 7 at 412, UE2 may send Msg3; now including MAC CE containing one or more G-CS-RNTI requesting reactivation of one or more SPS transmission. As illustrated with step 8 at 414, the network may send a new SPS activation at a time of the configured downlink assignment; thus reactivating the SPS using a group common PDCCH addressed to G-CS-RNTI. This PDCCH reception addressed to G-CS-RNTI may also act as contention resolution for the UE such as, for example, replacing random access (RA) Msg4. Any UE configured with MBS multicast and G-CS-RNTI can receive this PDCCH, and activate or re-activate SPS reception. The contention resolution timer may be configured to be equal or larger than the SPS periodicity such that network has opportunity to send SPS reactivation before the UE2 starts the random access again. As illustrated with step 9 at 416, after receiving the SPS activation, UE2 can receive the SPS transmissions sent without PDCCH.

Figure 5:
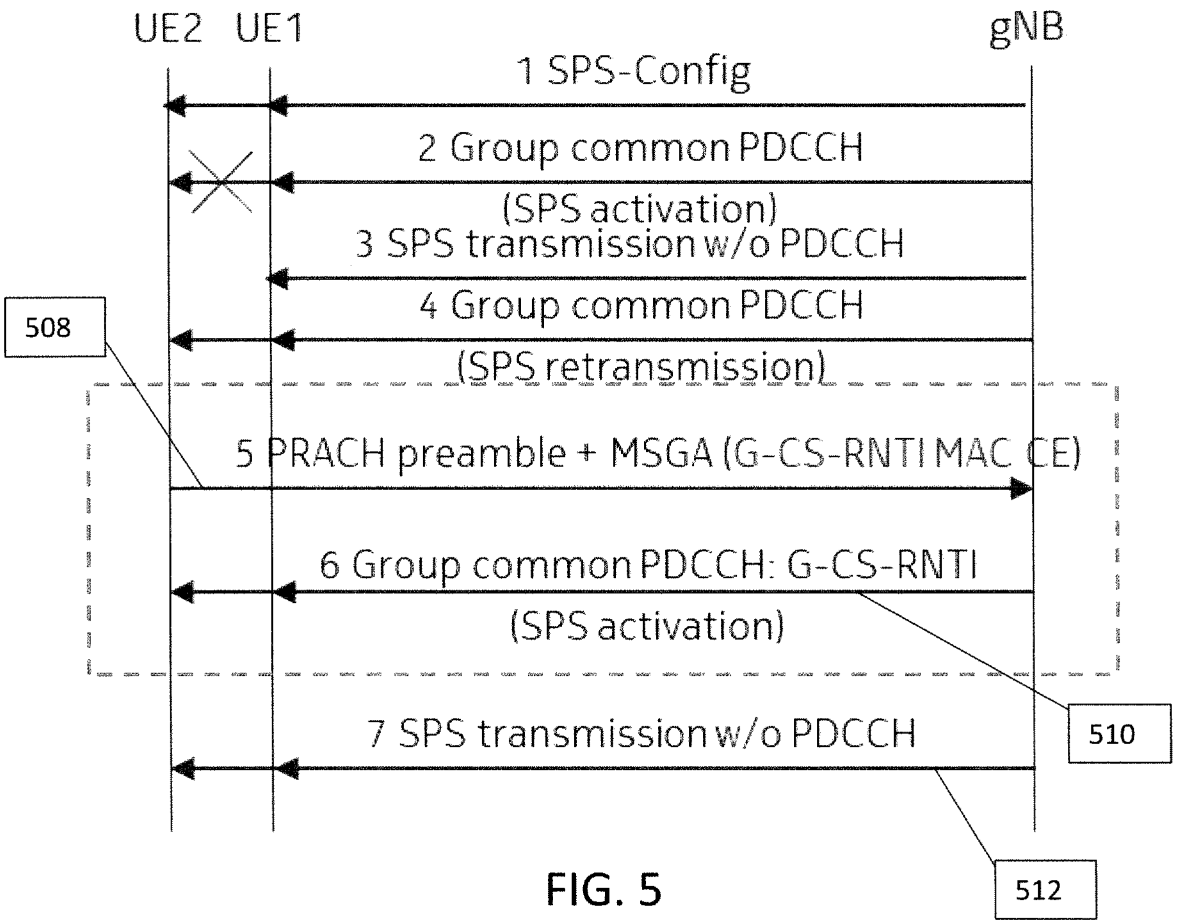
FIG. 5 is a diagram illustrating an example of one type of signaling method.

Referring also to FIG. 5, a diagram is shown for illustrating the signaling for the second example embodiment noted above, for the 2-step random access (RA) example, where the SPS activation request is a MAC CE sent in the 2-step random access MSGA. The MAC CE may include the G-CS-RNTI of the SPS transmission. The MAC CE could be called, for example:

- C-RNTI MAC CE where G-CS-RNTI of the SPS transmission replaces C-RNTI (and use LCID of C-RNTI MAC CE), or
- G-CS-RNTI MAC CE or SPS activation request MAC CE (new LCID should be reserved for it) (as shown in FIG. 5).

Steps 1 to 4 in FIG. 5 are the same as in FIG. 2 described above. As illustrated with step 5 at 508, when UE2 notices that SPS transmissions are ongoing, but UE2 has not received the SPS activation, the UE may start a normal 2-step random access and send a PRACH preamble during a PRACH occasion followed by message A (MSGA); now including MAC CE containing one or more G-CS-RNTI requesting activation of one or more SPS. The PRACH resource may be any PRACH resource, i.e., the PRACH preamble may be any preamble and PRACH occasion any PRACH occasion, or a specific PRACH resource, i.e., a specific PRACH preamble and/or specific PRACH occasion could be specified. As illustrated with step 6 at 510, the network may respond with a new SPS activation at a time of the configured downlink assignment; thus reactivating the SPS using a group common PDCCH addressed to G-CS-RNTI. This PDCCH reception addressed to G-CS-RNTI may also act as contention resolution for the UE such as, for example, replacing random access MSGB. The contention resolution timer may be configured equal or larger than the SPS periodicity such that network has an opportunity to send SPS reactivation (i.e., msgB-ResponseWindow configured equal or larger than SPS periodicity). Any UE configured with MBS multicast and G-CS-RNTI can receive this PDCCH and activate or re-activate SPS reception. As illustrated with step 7 at 512, after receiving the SPS activation, UE2 may also receive the SPS transmissions sent without PDCCH.

Figure 6:
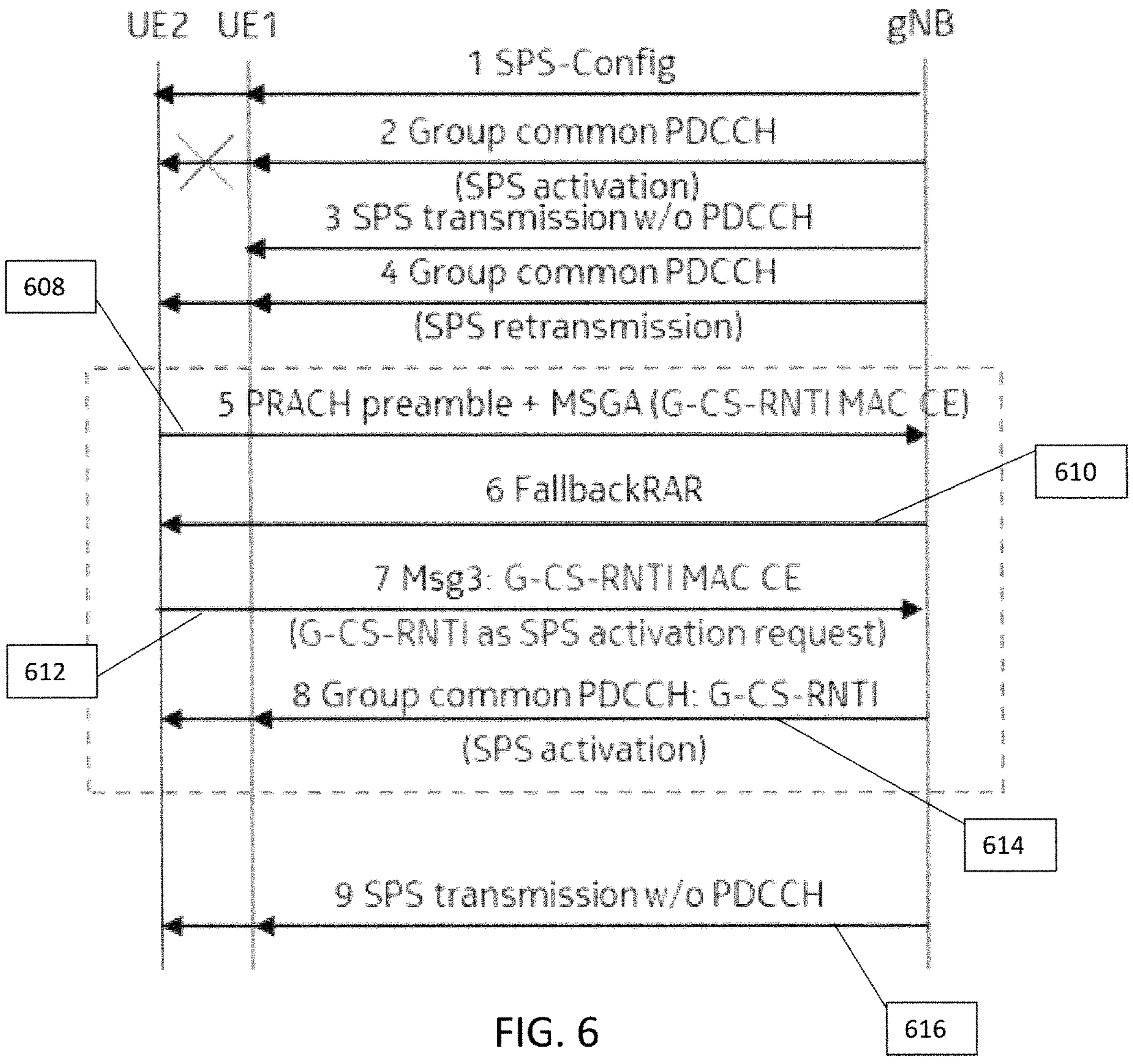
FIG. 6 is a diagram illustrating an example of one type of signaling method.

Referring also to FIG. 6, a diagram is shown for illustrating an example of the signaling for the second example embodiment noted above, for a 2-step RA with fallback to 4-step RA example, where the SPS activation request is a MAC CE sent in 2-step random access MSGA and repeated in 4-step random access Msg3. The MAC CE may include G-CS-RNTI of the SPS transmission. Similar to that described above, the MAC CE may be called:

C-RNTI MAC CE where G-CS-RNTI of the SPS transmission replaces C-RNTI (and use LCID of C-RNTI MAC CE), or G-CS-RNTI MAC CE or SPS activation request MAC CE (new LCID should be reserved for it) (as shown in FIG. 6).

Steps 1 to 4 in FIG. 6 are the same as in FIG. 2 described above. As illustrated with step 5 at 608, when UE2 notices that SPS transmissions are ongoing, but UE2 has not received the SPS activation, the UE starts a normal 2-step random access and sends a PRACH preamble in a PRACH occasion followed by message A (MSGA); now including MAC CE containing one or more G-CS-RNTI requesting activation of SPS. The PRACH resource may be any PRACH resource or a specific PRACH resource could be specified. As illustrated with step 6 at 610, if MSGA reception fails but the PRACH preamble is detected, then the gNB may respond with FallbackRAR (PDCCH addressed to MSGB-RNTI) and UE continues with 4-step RA. As illustrated with step 7 at 612, UE2 may send Msg3 with a same content as MSGA, i.e., G-CS-RNTI MAC CE. As illustrated with step 8 at 614, the network may respond with a new SPS activation at a time of the configured downlink assignment; thus reactivating the SPS using group common PDCCH addressed to G-CS-RNTI. Contention resolution may happen and random access may be successfully completed when UE2 receives SPS activation/deactivation via group common PDCCH addresses to G-CS-RNTI. msgB-ResponseWindow and ra-ContentionResolutionTimermay be configured equal or larger than SPS periodicity. If UE2 does not receive during msgB-ResponseWindow SPS activation/deactivation with PDCCH addresses to G-CS-RNTI or PDCCH addressed to MSGB-RNTI (fallbackRAR), UE2 may repeat step 5. As illustrated with step 9 at 616, after receiving the SPS activation, UE2 may also receive the SPS transmissions sent without PDCCH.

The new G-CS-RNTI MAC CE described above may also be sent without random access (i.e., not only in Msg3) such as, for example, together or after RRCResumeRequest, or together with some uplink data, such as uplink small data transmission for example.

Figure 7:
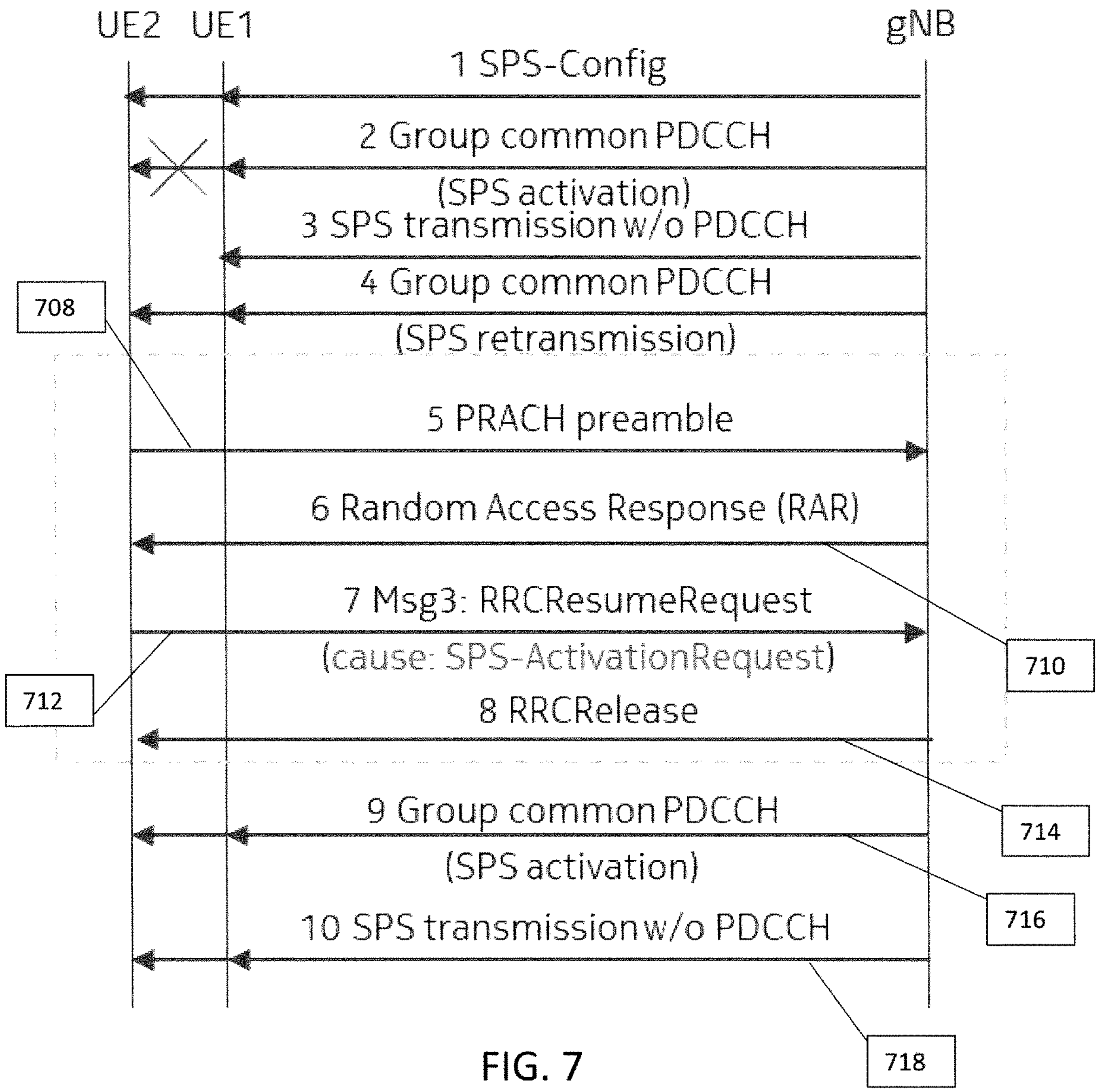
FIG. 7 is a diagram illustrating an example of one type of signaling method.

Referring also to FIG. 7, a diagram is shown for illustrating an example of the signaling for the third example embodiment noted above, where the SPS activation request is a new cause in RRCResumeRequest sent in random access Msg3. Steps 1 to 4 in FIG. 7 are the same as in FIG. 2 described above. As illustrated with step 5 at 708, when UE2 notices that SPS transmissions are ongoing, but UE2 has not received the SPS activation, the UE starts normal random access for RRC resume and sends a PRACH preamble. The PRACH resource (PRACH preamble and/or PRACH occasion) may be any PRACH resource or a specific PRACH resource could be specified. As illustrated with step 6 at 710, the network may respond with a random access response (RAR). RAR may include an uplink grant for the Msg3. RAR may also include a Temporary C-RNTI which is not needed here. As illustrated with step 7 at 712, UE2 may send Msg3; now including RRCResumeRequest with a new resume cause: a SPS activation request. Since there are a limited number of spare causes, SPS activation request here may not indicate G-CS-RNTI and, therefore, the network may reactivate all the MBS multicast SPS sessions. As illustrated with step 8 at 714, the network may respond with a contention resolution identity MAC CE and RRCRelease message (unless it wants UE2 to resume to RRC_CONNECTED). As illustrated with step 9 at 716, the network may send a new SPS activation at a time of the configured downlink assignment; thus reactivating the SPS using group common PDCCH addressed to G-CS-RNTI. Any UE configured with MBS multicast and G-CS-RNTI can receive this PDCCH and activate or re-activate SPS reception. As illustrated with step 10 at 718, after receiving the SPS activation, UE2 may receive the SPS transmissions sent without PDCCH.

Figure 8:
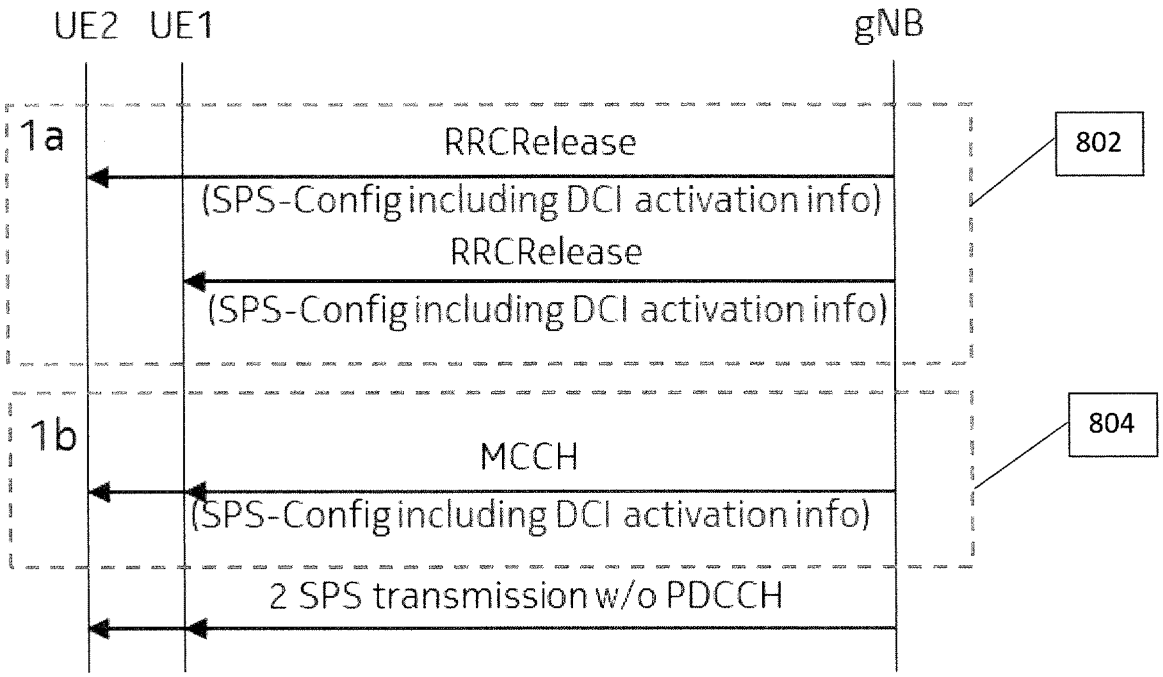
FIG. 8 is a diagram illustrating an example of one type of signaling method.

Referring also to FIG. 8, a diagram is shown for illustrating an example of the signaling for the example fourth embodiment, where DCI activation information ("DCI activation info" in the figure) is added to a RRC message configuring the SPS, and the RRC message is sent using dedicated RRC signalling (e.g., RRCRelease message, alternative 1*a* in FIG. 8 as illustrated at 802) or via MCCH (alternative 1*b* in FIG. 8 as illustrated at 804). This may mean specification of RRC configured downlink assignment (similar to configured grant (CG) Type 1 for uplink). Alternatively, DCI activation information may be provided in a separate message such as, for example, via MCCH or SIB. It should be noted that DCI activation information contains time resource info, frequency resource info, modulation and coding scheme, transport block size, etc.

Figure 9:
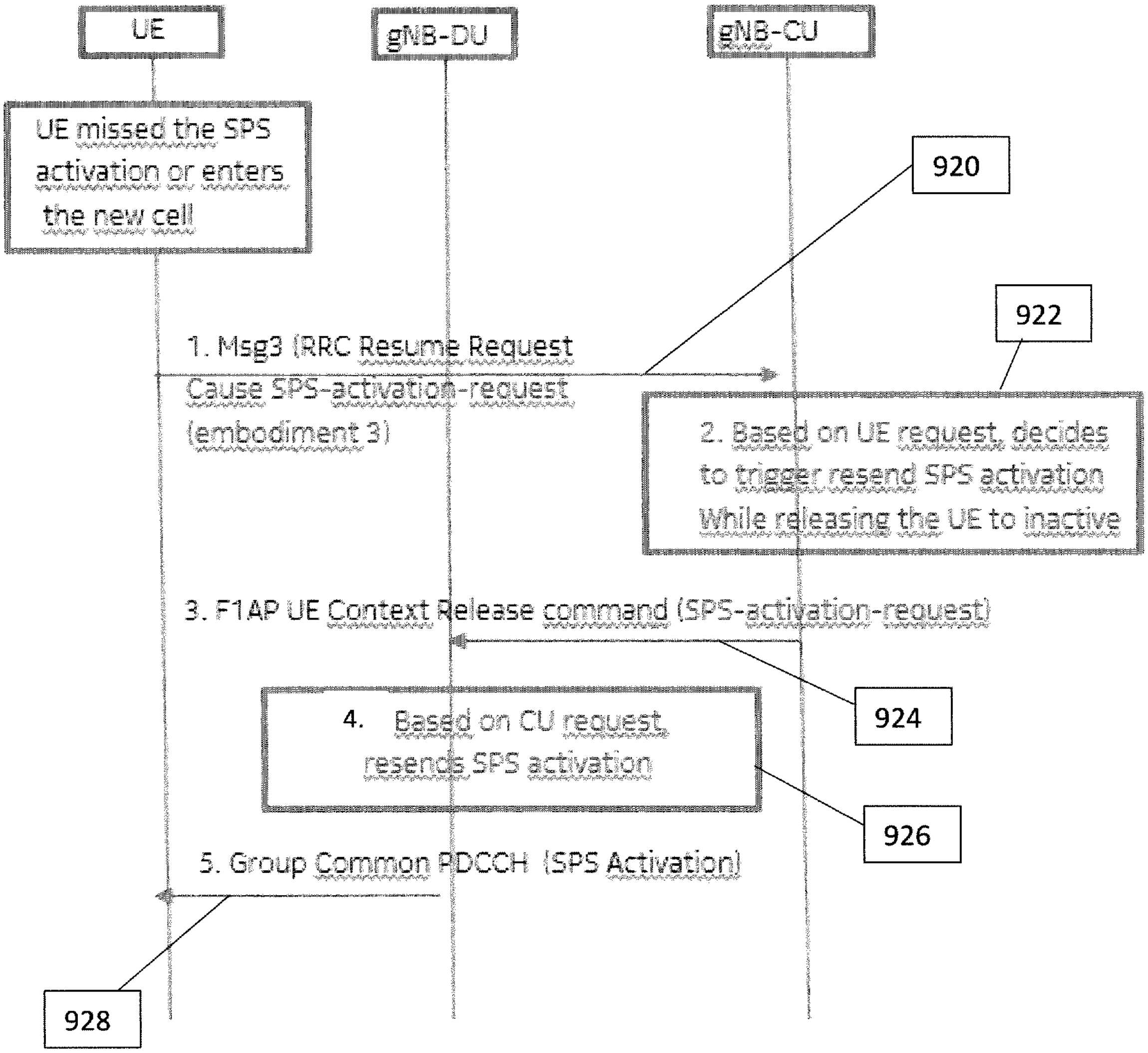
FIG. 9 is a diagram illustrating an example of one type of signaling method.

Features as described herein also enable the gNB-CU to receive a request from the UE to receive the SPS activation, such as the one of third example embodiment, and to trigger over F1AP the gNB-DU to send or re-send the SPS activation accordingly. This is illustrated with reference to FIG. 9 in regard to the fifth example embodiment noted above. As illustrated with step 1 at 920, the UE may request that the SPS Activation be sent again as per the third example embodiment noted above such as, for example, the UE sending Msg3 including RRC Resume Request with a new cause "SPS activation request". As illustrated with step 2 at 922, based on the request from the UE, the gNB-CU may decide to trigger resending the SPS activation by the DU. The gNB-CU may, therefore, sends an F1AP message to the DU to trigger the DU to resend the SPS activation, such as F1AP UE Context Release Command with suspend indication thereby sending also the UE back to RRC inactive. As illustrated with step 3 at 924, the gNB-CU may send the new F1AP message, such as F1AP UE Context release command, including a new information element "SPS activation request". As illustrated with step 4 at 926, based on the CU request, the gNB-DU may decide to resend the SPS activation. The gNB-DU may also decide not to resend (the final decision is at gNB-DU). As illustrated with step 5 at 928, the gNB-DU may resend the SPS Activation.

The proposed methods may be provided in order for proper operation of multicast reception by UEs in RRC_INACTIVE state. The aim of Rel-18 objective is also to provide inter-operability with Rel-17 multicast feature. Therefore, if the gNB intends to use Rel-17 SPS transmissions for multicast, a new behavior as proposed above may be provided for UEs receiving multicast in RRC_INACTIVE state and with features of Rel-18.

With features as described herein, the SPS activation request may be provided to allow "on-demand" SPS activation for MBS multicast, especially for UEs in RRC_INACTIVE (specified in Rel-18) (or in RRC_IDLE, to be specified later). There is no need to send frequent SPS activations or re-activations with PDCCH addressed to G-CS-RNTI as would be the case without features as described herein. With features as described in regard to the first example embodiment noted above, these may be provided in a case where only one or only a few G-CS-RNTI(s) is (are) configured such as, for example, in case a special PRACH resource can be configured for each G-CS-RNTI.

With features as described in regard to the second example embodiment noted above (with either 4-step or 2-step RA), it may not require any special PRACH resources (normal preamble and PRACH occasion selection rules may apply), and the MAC CE may tell the exact G-CS-RNTI(s) to be activated or re-activated.

With features as described herein, Point to Multi-Point (PTM) transmissions may be used for efficiently provisioning MBS services to multiple users by using a same radio framework as unicast transmission.

Currently, when a UE is released to RRC_INACTIVE, the UE stops sending feedback, i.e., neither (H-) ARQ nor other feedback can be sent. Thus, if SPS is configured for MBS multicast, the network does not know whether UEs in RRC_INACTIVE have received the SPS activation or deactivation. If UE has missed the SPS activation, it cannot receive the SPS transmissions since the PDSCH for the subsequent transmissions is transmitted without PDCCH (and DCI). Also, when a UE in RRC_INACTIVE enters a cell where SPS transmission for MBS multicast has been activated. Those UEs are not able to receive SPS transmission. With features as described herein, a missed SPS activation may be addressed. In some example embodiments the network configures a UE with a a dedicated PRACH resource for requesting SPS activation. The UE transmits to the network an SPS activation request, wherein the activation request is sent via PRACH resource or via RA Msg3/MSGA (using a new MAC CE or reusing C-RNTI MAC CE) or via RRCResumeRequest message from the UE in RRC_INACTIVE state when it determines that SPS has been activated. The network then knows whether a UE in RRC_INACTIVE has received the SPS activation or deactivation. Thus, configuring by the network in a UE of a dedicated preamble for requesting SPS activation may be provided, and transmitting by the UE to the network an SPS activation request may be provided, wherein the activation request may be sent via RACH or via RRCResumeRequest message from the UE in RRC_INACTIVE state when it determines that SPS has been activated. Thus, configuring by the network in a UE of a dedicated preamble for requesting SPS activation may be provided, and transmitting by the UE to the network an SPS activation request, wherein the activation request is sent via RACH or via Msg3 (using a new MAC CE or reusing C-RNTI MAC CE) or via RRCResumeRequest message from the UE in RRC_INACTIVE state when it determines that SPS has been activated may also be provided.

Figure 10:
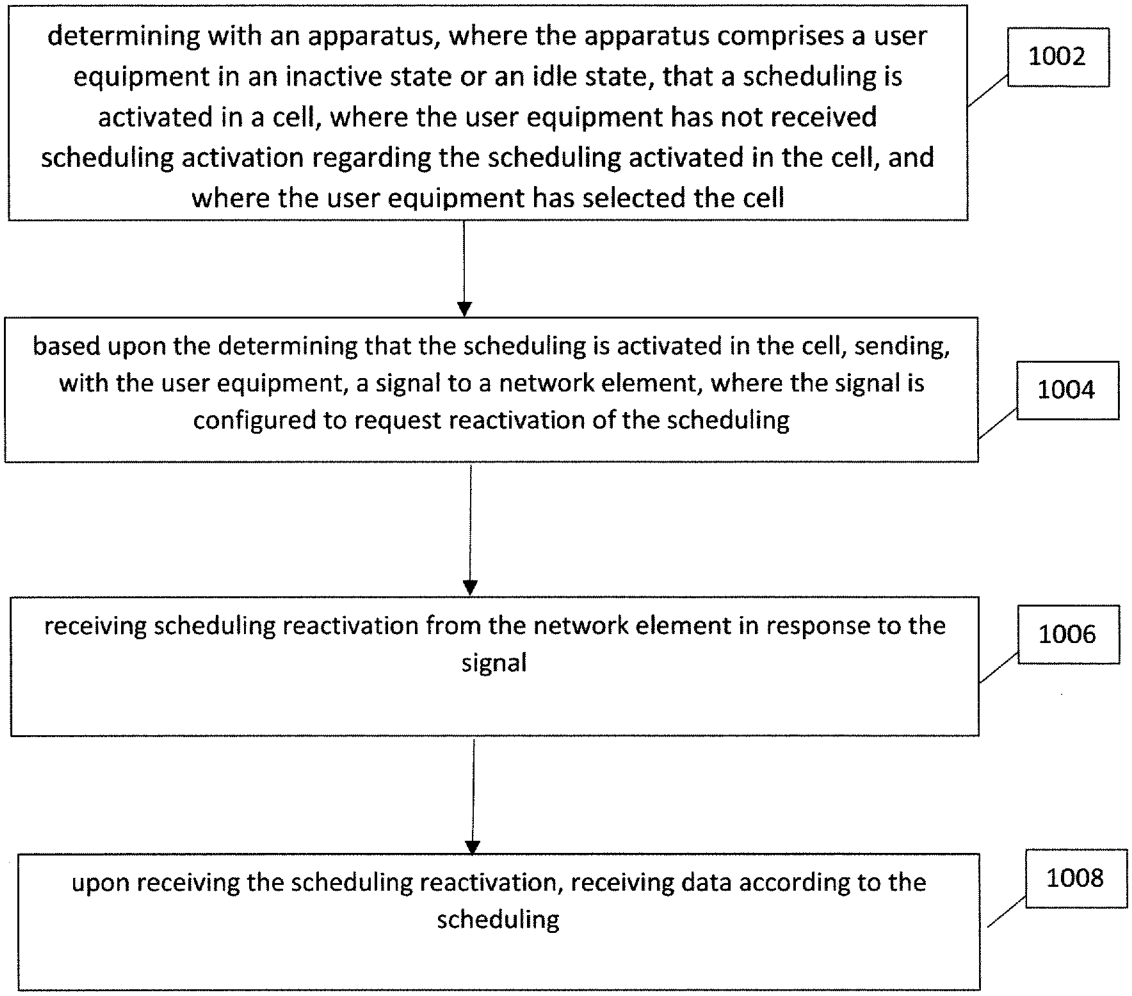
FIG. 10 is a diagram illustrating an example of one type of method.

Referring also to FIG. 10, in one type of example embodiment, an example method is provided comprising: determining, with a user equipment in an inactive state or an idle state, that a scheduling is activated in a cell, where the user equipment has not received scheduling activation regarding the scheduling activated in the cell, and where the user equipment has selected the cell as illustrated with block 1002; based upon the determining that the scheduling is activated in the cell, sending, with the user equipment, a signal to a network element, where the signal is configured to request reactivation of the scheduling as illustrated with block 1004; receiving scheduling reactivation from the network element in response to the signal as illustrated with block 1006; and upon receiving the scheduling reactivation, receiving data according to the scheduling as illustrated with block 1008.

Figure 12:
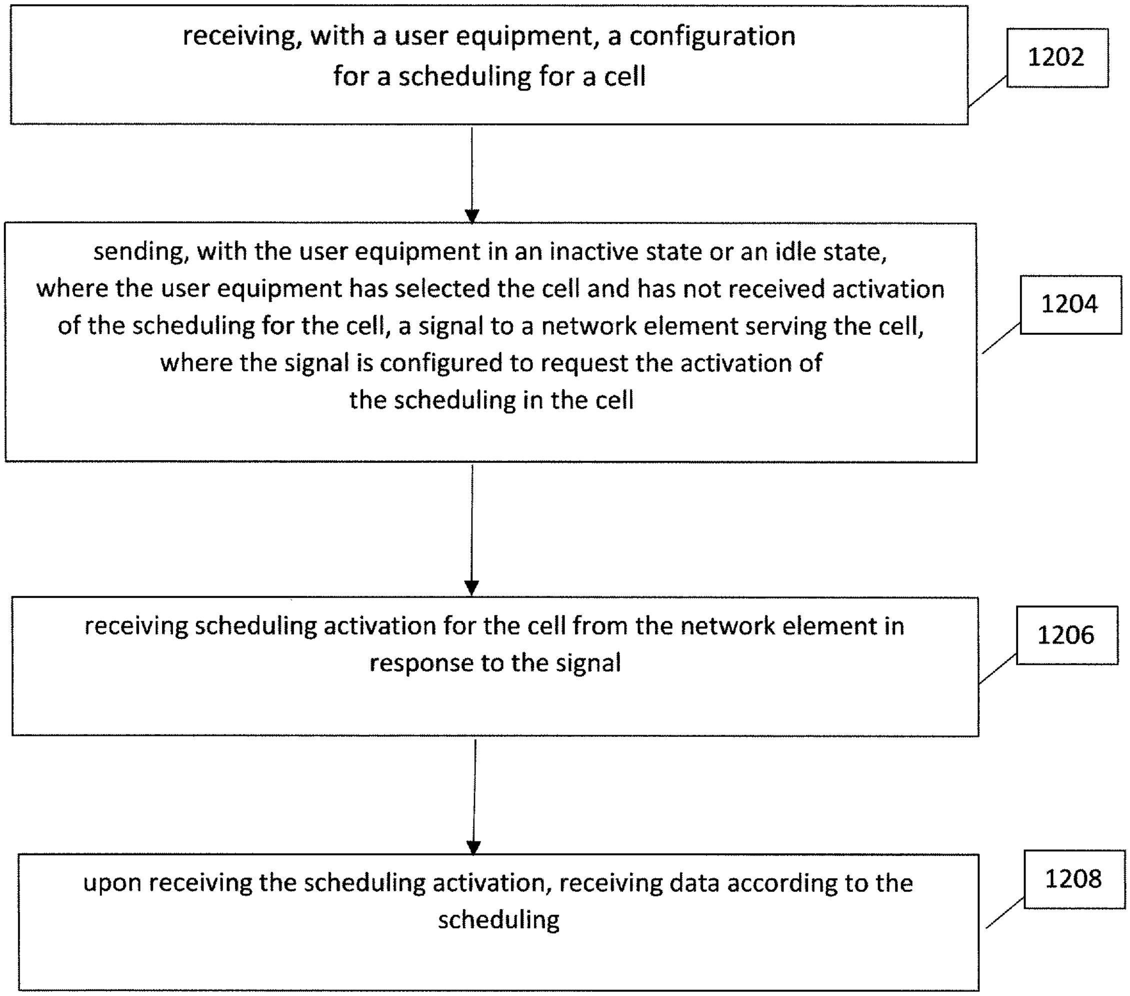
FIG. 12 is a diagram illustrating an example of one type of method.

Referring also to FIG. 12, in one type of example embodiment, an example method is provided comprising: receiving, with a user equipment, a configuration for a scheduling for a cell as illustrated with block 1202; sending, with the user equipment in an inactive state or an idle state, where the user equipment has selected the cell and has not received activation of the scheduling for the cell, a signal to a network element, where the signal is configured to request the activation of the scheduling as illustrated with block 1204; receiving scheduling activation from the network element in response to the signal as illustrated with block 1206; and upon receiving the scheduling activation, receiving data according to the scheduling as illustrated with block 1208.

The scheduling may comprise semi-persistent scheduling (SPS). The semi-persistent scheduling may be configured for a multicast service. The determining that the scheduling is activated in the cell may be based, at least partially, upon determining that the user equipment has entered the cell. The signal may comprise use of a PRACH resource configured for requesting the activation of the scheduling. The PRACH resource may comprise one of: a PRACH preamble, or a PRACH occasion, or a PRACH preamble and a PRACH occasion. The signal may comprise use of a random access preamble configured for requesting the activation of the scheduling. The preamble may comprise a single dedicated preamble requesting the network element to reactivate the scheduling for all multicast transmissions. The preamble may comprise a dedicated preamble for a group configured scheduling radio network temporary identifier (G-CS-RNTI). The signal may comprise use of a random access channel (PRACH) occasion. The signal may comprise a MAC CE that contains one or more G-CS-RNTI. The signal may comprise a random access (RA) Msg3 or MSGA signal with a medium access control-control element (MAC-CE). The MAC-CE may comprise one or more G-CS-RNTIs. The MAC-CE may be a reused cell radio network temporary identifier (C-RNTI) MAC-CE. The receiving scheduling reactivation from the network element may act as a random access response or a random access contention resolution and complete the random access procedure. Window length for receiving the random access response or the contention resolution may be configured equal or larger than the periodicity of the scheduling. The signal may comprise a RRCResumeRequest message. The RRCResumeRequest message may comprise a predetermined resume cause configured for signaling the activation request. The method may further comprise receiving, with the user equipment, a group common physical downlink control channel, addressed to a group configured scheduling radio network temporary identifier, configured for activating the scheduling. The determining that the scheduling is activated in the cell may comprise the user equipment detecting a retransmission for a predetermined group configured scheduling radio network temporary identifier.

In one type of example embodiment, an example method is provided comprising: receiving, with a user equipment, scheduling configuration information including downlink control information activation information; and based, at least partially upon the received scheduling configuration information, receiving data according to the scheduling configuration information. The downlink control information may be provided with a system information block (SIB) or a multicast and broadcast services (MBS) control channel. The method may further comprise receiving, with the user equipment, a group common physical downlink control channel, from a distributed unit, where the group common physical downlink control channel comprises information configured for activating the scheduling with the user equipment. The information may comprise information specific to a group configured scheduling radio network temporary identifier.

In one type of example embodiment, an apparatus may be provided comprising: at least one processor; and at least one non-transitory memory storing instructions that, when executed with the at least one processor, cause the apparatus to perform: determining with the apparatus, where the apparatus comprises a user equipment in an inactive state or an idle state, that a scheduling is activated in a cell, where the user equipment has not received scheduling activation regarding the scheduling activated in the cell, and where the user equipment has selected the cell; based upon the determining that the scheduling is activated in the cell, sending, with the user equipment, a signal to a network element, where the signal is configured to request reactivation of the scheduling; receiving scheduling reactivation from the network element in response to the signal, and upon receiving the scheduling reactivation, receiving data according to the scheduling.

In one type of example embodiment, an apparatus may be provided comprising: at least one processor; and at least one non-transitory memory storing instructions that, when executed with the at least one processor, cause the apparatus to perform: receiving a configuration for a scheduling for a cell; sending, with the apparatus in an inactive state or in an idle state where the apparatus has selected the cell and has not received activation of the scheduling for the cell, a signal to a network element, where the signal is configured to request the activation of the scheduling; receiving scheduling activation from the network element in response to the signal; and upon receiving the scheduling activation, receiving data according to the scheduling.

The scheduling may comprise semi-persistent scheduling (SPS). The semi-persistent scheduling may be configured for a multicast service. The determining that the scheduling is activated in the cell may be based, at least partially, upon determining that the user equipment has entered the cell. The signal may comprise use of a PRACH resource configured for requesting the activation of the scheduling. The PRACH resource may comprise one of: a PRACH preamble, or a PRACH occasion, or a PRACH preamble and a PRACH occasion. The signal may comprise use of a random access preamble configured for requesting the activation of the scheduling. The preamble may comprise a single dedicated preamble requesting the network element to reactivate the scheduling for all multicast transmissions. The preamble may comprise a dedicated preamble for a group configured scheduling radio network temporary identifier (G-CS-RNTI). The signal may comprise use of a random access channel (PRACH) occasion. The signal may comprise a MAC CE that contains one or more G-CS-RNTI. The signal may comprise a random access (RA) Msg3 or MSGA signal with a medium access control-control element (MAC-CE). The MAC-CE may comprise one or more G-CS-RNTIs. The MAC-CE may be a reused cell radio network temporary identifier (C-RNTI) MAC-CE. The receiving scheduling reactivation from the network element may act as a random access response or a random access contention resolution and complete the random access procedure. Window length for receiving the random access response or the contention resolution may be configured equal or larger than the periodicity of the scheduling. The signal may comprise a RRCResumeRequest message. The RRCResumeRequest message may comprise a predetermined resume cause configured for signaling the activation request. The instructions, when executed with the at least one processor, may cause the apparatus to perform receiving, with the user equipment, a group common physical downlink control channel, addressed to a group configured scheduling radio network temporary identifier, configured for activating the scheduling. The determining that the scheduling is activated in the cell may comprise the user equipment detecting a retransmission for a predetermined group configured scheduling radio network temporary identifier.

In one type of example embodiment, an apparatus may be provided comprising: means for determining with the apparatus, where the apparatus comprises a user equipment in an inactive state or an idle state, that a scheduling is activated in a cell, where the user equipment has not received scheduling activation regarding the scheduling activated in the cell, and where the user equipment has selected the cell; and means for, based upon the determining that the scheduling is activated in the cell, sending, with the user equipment, a signal to a network element, where the signal is configured to request reactivation of the scheduling; and means for receiving scheduling reactivation from the network element in response to the signal, and means for, upon receiving the scheduling reactivation, receiving data according to the scheduling.

In one type of example embodiment, an apparatus may be provided comprising: means for receiving a configuration for a scheduling for a cell; means for sending, with the apparatus in an inactive state or an idle state where the apparatus has selected the cell and has not received activation of the scheduling for the cell, a signal to a network element, where the signal is configured to request the activation of the scheduling; means for receiving scheduling activation from the network element in response to the signal; and means for, upon receiving the scheduling activation, receiving data according to the scheduling.

In one type of example embodiment, a non-transitory program storage device readable by an apparatus may be provided, tangibly embodying a program of instructions executable with the apparatus for performing operations, the operations comprising: determining with the apparatus, where the apparatus comprises a user equipment in an inactive state or an idle state, that a scheduling is activated in a cell, where the user equipment has not received scheduling activation regarding the scheduling activated in the cell, and where the user equipment has selected the cell; based upon the determining that the scheduling is activated in the cell, sending, with the user equipment, a signal to a network element, where the signal is configured to request reactivation of the scheduling; receiving scheduling reactivation from the network element in response to the signal, and upon receiving the scheduling reactivation, receiving data according to the scheduling.

In one type of example embodiment, a non-transitory program storage device readable by an apparatus may be provided, tangibly embodying a program of instructions executable with the apparatus for performing operations, the operations comprising: receiving, with the apparatus where the apparatus comprises a user equipment, a configuration for a scheduling for a cell; sending, with the user equipment in an inactive state or an idle state where the user equipment has selected the cell and has not received activation of the scheduling for the cell, a signal to a network element, where the signal is configured to request the activation of the scheduling; receiving scheduling activation from the network element in response to the signal; and upon receiving the scheduling activation, receiving data according to the scheduling.

In one type of example embodiment, an apparatus may be provided comprising: means for receiving with the apparatus, where the apparatus comprises a user equipment, scheduling configuration information including downlink control information activation information; and means for, based at least partially upon the received scheduling configuration information, receiving data according to the scheduling configuration information.

In one type of example embodiment, an apparatus may be provided comprising: means for receiving with the apparatus, where the apparatus comprises a user equipment, scheduling configuration information including downlink control information activation information; and means for, based at least partially upon the received scheduling configuration information, receiving data according to the scheduling configuration information.

Figure 11:
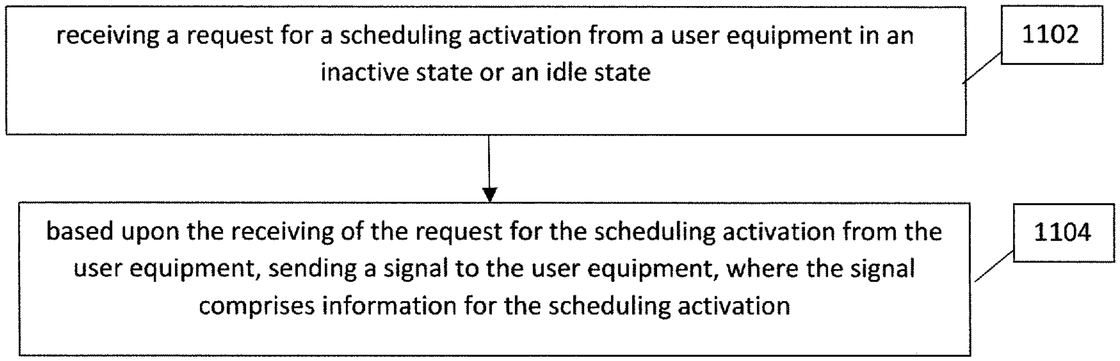
FIG. 11 is a diagram illustrating an example of one type of method.

Referring also to FIG. 11, in one type of example embodiment, an example method may be provided comprising: receiving a request for a scheduling activation from a user equipment in an inactive state or an idle state as illustrated with block 1102; and based upon the receiving of the request for the scheduling activation from the user equipment, sending a signal to the user equipment, where the signal comprises information for the scheduling activation as illustrated with block 1104.

The scheduling for the scheduling activation may comprise semi-persistent scheduling (SPS). The semi-persistent scheduling may be configured for multicast and broadcast services (MBS). The request may be with a preamble configured for requesting the activation of the scheduling. The preamble may comprise a single dedicated preamble requesting to reactivate the scheduling for all multicast transmissions. The preamble may comprise a dedicated preamble for a group configured scheduling radio network temporary identifier (G-CS-RNTI). The request comprises use of a random access channel (RACH) occasion. The request may comprise a random access (RA) Msg3 or MSGA signal with a medium access control-control element (MAC-CE). The MAC-CE may comprise one or more G-CS-RNTIs. The MAC-CE may be a reused cell radio network temporary identifier (C-RNTI) MAC-CE. The signal for scheduling reactivation may replaces a random access response message or a random access contention resolution message and completes the random access procedure. Window length for receiving the random access response message or the contention resolution message by the UE may be configured for the UE equal or larger than the periodicity of the scheduling. The request may be received with a RRCResumeRequest message. The RRCResumeRequest message may comprise a predetermined resume cause configured for signaling the activation request. Sending the signal may comprise using a group common physical downlink control channel, addressed to a group configured scheduling radio network temporary identifier, configured for activating the scheduling with one or more of the user equipment. Sending the signal may comprise using a group common physical downlink control channel, from a distributed unit, where the group common physical downlink control channel comprises information configured for activating the scheduling with the user equipment. The information may comprise information specific to a group configured scheduling radio network temporary identifier. The request may be received with a central unit (CU), and the central unit signals a distributed unit (DU) for sending the signal to the user equipment. The request may be received with a RRCResumeRequest message, and the method comprises sending a RRCResumeReject message to keep the user equipment in the inactive state.

In one type of example embodiment, an apparatus is provided comprising: at least one processor; and at least one non-transitory memory storing instructions that, when executed with the at least one processor, cause the apparatus to perform: receiving a request for a scheduling activation from a user equipment in an inactive state or an idle state; and based upon the receiving of the request for the scheduling activation from the user equipment, sending a signal to the user equipment, where the signal comprises information for the scheduling activation.

In one type of example embodiment, an apparatus is provided comprising: means for receiving a request for a scheduling activation from a user equipment in an inactive state or an idle state; and means for, based upon the receiving of the request for the scheduling activation from the user equipment, sending a signal to the user equipment, where the signal comprises information for the scheduling activation.

In one type of example embodiment, a non-transitory program storage device readable by an apparatus may be provided, tangibly embodying a program of instructions executable with the apparatus for performing operations, the operations comprising: receiving a request for a scheduling activation from a user equipment in an inactive state or an idle state; and based upon the receiving of the request for the scheduling activation from the user equipment, sending a signal to the user equipment, where the signal comprises information for the scheduling activation.

In regard to sending the activation request by the UE, the UE may send the activation request upon an occasion of the UE entering a cell. Also, besides the inactive state, features are also applicable when the UE is in an idle state. Also, features may be used other than with a random access procedure. For example, an alternative is with use of any UL transmission such as, for example, where G-CS-RNTI is sent without random access.

The term "non-transitory," as used herein, is a limitation of the medium itself (i.e., tangible, not a signal) as opposed to a limitation on data storage persistency (e.g., RAM vs. ROM).

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and (iii) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:

at least one processor; and at least one non-transitory memory storing instructions that, when executed with the at least one processor, cause the apparatus to perform:

receiving a configuration for a scheduling for a cell, wherein the scheduling comprises semi-persistent scheduling (SPS) configured for a multicast or a broadcast service;

determining that the scheduling has been activated in the cell, wherein the determining comprises detecting a retransmission for a predetermined group configured scheduling radio network temporary identifier (G-CS-RNTI), the retransmission being one that the apparatus cannot decode due to not having received the activation;

in response to the determining, sending, with the apparatus in an inactive state or in an idle state where the apparatus has selected the cell and has not received activation of the scheduling for the cell, without transitioning to a connected state to perform the sending, via a random access procedure, a signal to a network element serving the cell, where the signal is configured to request the activation of the scheduling in the cell;

receiving scheduling activation for the cell from the network element in response to the signal; and upon receiving the scheduling activation, receiving data according to the scheduling.

2. The apparatus as claimed in claim 1 wherein the sending is based, at least partially, upon determining that the apparatus has entered the cell.

3. The apparatus as claimed in claim 1 wherein the signal comprises a dedicated PRACH preamble configured together with an SPS configuration (SPS-Config), the dedicated PRACH preamble comprising one of: a single dedicated PRACH resource requesting the network element to activate the scheduling for all multicast transmissions, or a dedicated PRACH resource per group configured scheduling radio network temporary identifier (G-CS-RNTI).

4. The apparatus as claimed in claim 3 wherein the network element responds with a random access response (RAR) containing a random-access preamble ID (RAPID), and the random access procedure ends upon receiving the RAR.

5. The apparatus as claimed in claim 1 wherein the signal comprises a MAC CE in a random access Msg3 or MSGA signal, the MAC CE containing one or more G-CS-RNTIs requesting activation of one or more SPS transmissions.

6. The apparatus as claimed in claim 5 wherein the MAC CE is a reused cell radio network temporary identifier (C-RNTI) MAC-CE wherein the G-CS-RNTI replaces C-RNTI.

7. The apparatus as claimed in claim 5 wherein the MAC CE uses a new logical channel identifier (LCID) reserved for a G-CS-RNTI MAC CE or SPS activation request MAC CE.

8. The apparatus as claimed in claim 1 wherein the signal comprises a RRCResumeRequest message with a predetermined resume cause configured for signaling the activation request.

9. The apparatus as claimed in claim 8 wherein the network element responds with a RRCRelease message to keep the apparatus in the inactive state.

10. The apparatus as claimed in claim 8 wherein the network element responds with a RRCResumeReject message to keep the apparatus in the inactive state.

11. The apparatus as claimed in claim 8 wherein the predetermined resume cause does not indicate a G-CS-RNTI, and wherein the network element reactivates all MBS multicast SPS sessions in response.

12. The apparatus as claimed in claim 5 wherein the signal is sent via a 2-step random access procedure comprising a PRACH preamble followed by MSGA including the MAC CE containing one or more G-CS-RNTIs, and wherein upon failure of the 2-step random access, falling back to a 4-step random access procedure and resending the MAC CE in Msg3, wherein the receiving scheduling activation from the network element acts as a random access contention resolution and completes the random access procedure, and wherein a msgB-ResponseWindow or a contention resolution timer is configured equal or larger than the SPS periodicity.

13. The apparatus as claimed in claim 4 wherein the network element sends the scheduling activation at a time of the configured downlink assignment, reactivating the scheduling using a group common PDCCH addressed to the G-CS-RNTI.

14. The apparatus as claimed in claim 3 wherein the dedicated PRACH preamble is configured to the apparatus together with the SPS configuration when the apparatus is released to the inactive state or via a multicast control channel (MCCH).

15. The apparatus as claimed in claim 1 wherein, upon failure to receive the scheduling activation after the sending of the signal, the apparatus is configured to transition to an RRC_CONNECTED state to acquire the scheduling activation.

16. The apparatus as claimed in claim 1 wherein the scheduling comprises SPS configured for a multicast service via a RRCRelease message or via MCCH, wherein the signal comprises a dedicated PRACH preamble configured together with the SPS configuration, wherein the network element responds with a RAR containing RAPID, wherein the scheduling activation is received via a group common PDCCH from a distributed unit addressed to the G-CS-RNTI, wherein the network element sends the scheduling activation at a time of the configured downlink assignment, and wherein the apparatus receives SPS transmissions without PDCCH after receiving the scheduling activation.

* * * * *